(12) United States Patent
Zheng et al.

(10) Patent No.: US 12,345,814 B2
(45) Date of Patent: Jul. 1, 2025

(54) PROXIMITY SENSOR BASED COMMUNICATIONS INTERFACE FOR ELECTRONIC DEVICES

(71) Applicant: Apple Inc., Cupertino, CA (US)

(72) Inventors: Dong Zheng, Los Altos, CA (US); James M. Hollabaugh, San Jose, CA (US); Jihyun Cho, Cupertino, CA (US); Narendra S. Mehta, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 1024 days.

(21) Appl. No.: 17/373,533

(22) Filed: Jul. 12, 2021

(65) Prior Publication Data

US 2023/0011498 A1    Jan. 12, 2023

(51) Int. Cl.
*G01S 17/04* (2020.01)
*G01S 7/4861* (2020.01)
*H04B 10/516* (2013.01)
*H04B 10/60* (2013.01)

(52) U.S. Cl.
CPC ............ *G01S 17/04* (2020.01); *G01S 7/4861* (2013.01); *H04B 10/516* (2013.01); *H04B 10/60* (2013.01)

(58) Field of Classification Search
None
See application file for complete search history.

(56) References Cited

U.S. PATENT DOCUMENTS

| | | |
|---|---|---|
| 8,829,414 B2 | 9/2014 | Fadell et al. |
| 9,466,653 B2 | 10/2016 | de Jong et al. |
| 9,662,053 B2 | 5/2017 | Richards et al. |
| 10,097,640 B2 | 10/2018 | Kim |
| 10,948,567 B2 | 3/2021 | Eberspach et al. |
| 2003/0002108 A1* | 1/2003 | Ames ............... H04B 10/6932 398/139 |
| 2006/0258454 A1* | 11/2006 | Brick ................. A63F 13/837 463/36 |
| 2007/0248192 A1* | 10/2007 | Brunsch ............ H04L 27/0012 375/340 |
| 2011/0002362 A1* | 1/2011 | Michaels ........... H04L 27/001 375/138 |

(Continued)

FOREIGN PATENT DOCUMENTS

| | | |
|---|---|---|
| EP | 2806654 A1 | 11/2014 |
| JP | 2014120285 A | 6/2014 |

(Continued)

*Primary Examiner* — Darren E Wolf
(74) *Attorney, Agent, or Firm* — Treyz Law Group; Jason Tsai

(57) ABSTRACT

An electronic device may include a proximity sensor for detecting whether an external object is in the vicinity of the device. The proximity sensor may have a light detector and a light source that can be reused for data communications. The light detector may be coupled to optical receiver circuitry, whereas the light source may be coupled to optical transmitter circuitry. The optical transmitter circuitry may include encoding circuits configured to convert electrical signals to optical signals. The optical receiver circuitry may include decoding circuits configured to convert optical signals to electrical signals. The optical signals can be encoded and decoded using pulse width modulation schemes or amplitude modulation schemes.

17 Claims, 14 Drawing Sheets

(56) References Cited

U.S. PATENT DOCUMENTS

| | | | | |
|---|---|---|---|---|
| 2012/0014694 | A1* | 1/2012 | Templ | H04B 10/25759 |
| | | | | 398/43 |
| 2013/0294782 | A1* | 11/2013 | Liboiron-Ladouceur | ................... |
| | | | | H03M 13/458 |
| | | | | 398/202 |
| 2014/0368675 | A1* | 12/2014 | Hiroki | H04N 1/00127 |
| | | | | 348/207.2 |
| 2016/0360350 | A1* | 12/2016 | Watson | H04W 4/70 |
| 2016/0380758 | A1* | 12/2016 | Sai | H03D 3/24 |
| | | | | 375/376 |
| 2018/0364869 | A1 | 12/2018 | Lee et al. | |
| 2019/0069835 | A1 | 3/2019 | Xu et al. | |
| 2019/0132503 | A1* | 5/2019 | Spanos | H04B 10/516 |
| 2020/0122743 | A1* | 4/2020 | Badigannavar | G08G 1/147 |
| 2021/0096660 | A1 | 4/2021 | Xie et al. | |

FOREIGN PATENT DOCUMENTS

| | | | |
|---|---|---|---|
| WO | WO-2017125747 A1 * | 7/2017 | |
| WO | 2020093937 A1 | 5/2020 | |
| WO | 2021052110 A1 | 3/2021 | |

\* cited by examiner

|  |  |  | Next State | | | |
|---|---|---|---|---|---|---|
|  |  | eD+ | 0 | 0 | 1 | 1 |
|  |  | eD- | 0 | 1 | 0 | 1 |
| | eD+ | eD- | | | | |
| Previous state | 0 | 0 | 0 | 1 | 2 | 3 |
| | 0 | 1 | 2 | 0 | 3 | 1 |
| | 1 | 0 | 1 | 3 | 0 | 2 |
| | 1 | 1 | 3 | 2 | 1 | 0 |

|  |  |  | Symbol | | | |
|---|---|---|---|---|---|---|
|  |  |  | 0 | 1 | 2 | 3 |
| | eD+ | eD- | | | | |
| Previous state | 0 | 0 | 00 | 01 | 10 | 11 |
| | 0 | 1 | 01 | 11 | 00 | 10 |
| | 1 | 0 | 10 | 00 | 11 | 01 |
| | 1 | 1 | 11 | 10 | 01 | 00 |

PROXIMITY SENSOR BASED COMMUNICATIONS INTERFACE FOR ELECTRONIC DEVICES

FIELD

This relates generally to electronic devices and, more particularly, to electronic devices with proximity sensors.

BACKGROUND

Electronic devices often include components that have sensors. For example, earbuds, cellular telephones, and other devices sometimes have light-based components such as light-based proximity sensors. A light-based proximity sensor may have a light source such as an infrared light-emitting diode and may have a light detector.

During operation, the light source emits light. In the presence of nearby objects, some of the emitted light is reflected back towards the proximity sensor and is detected by the light detector. By monitoring the amount of reflected light at the light detector, an electronic device may determine whether an external object is in the vicinity of the electronic device. The proximity sensor typically does not offer additional functions other than for detecting the presence of a nearby external object.

SUMMARY

An electronic device may have control circuitry and input-output components. The input-output components may include audio components, sensors, displays, and other devices. A proximity sensor may supply the control circuitry with proximity sensor data. The control circuitry may adjust the audio components, displays, or take other suitable action in response to proximity sensor readings from the proximity sensor.

The proximity sensor may be a light-based proximity sensor having a light source such as an infrared laser diode and a light detector that measures a reflected portion of infrared light pulses emitted by the infrared laser diode. The light detector of the proximity sensor can be reused to receive optical data from a remote data source. The remote data source may perform a firmware update or conduct other chip-to-chip communications by transmitting the optical data.

The optical data includes one or more pulse signals. In some embodiments, the remote data source may encode the optical data using a pulse width modulation scheme while the electronic device decodes the optical data using a pulse width modulation detection scheme to determine the pulse width of the pulse signals. A normalized pulse width modulation detection scheme can be performed by comparing the detected pulse width to a baseline pulse width.

In other embodiments, the remote data source may encode the optical data signal using an amplitude modulation scheme while the electronic device decodes the optical data using an amplitude modulation detection scheme to determine the amplitude of the pulse signals. A normalized amplitude modulation detection scheme can be performed by comparing the detected amplitude to a baseline amplitude level.

The optical data may be conveyed between the remote data source and the electronic device using at least first and second data communications modes. In the first (in-band) data communications mode, the pulse signals have a pulse width that is less than a predetermined time interval. In the second (out-of-band) data communications mode, the pulse signals have a pulse width greater than the predetermined time interval. Operated in this way, the first data communications mode may be used for higher speed data transfers or communication required to meet certain data communication protocols such as eUSB2, whereas the second data communications mode may be used for lower speed chip-to-chip communications.

BRIEF DESCRIPTION OF THE DRAWINGS

FIG. 3A is a table showing an illustrative electrical-to-optical signal encoding scheme in accordance with some embodiments.

FIG. 3B is a table showing an illustrative optical-to-electrical signal decoding scheme in accordance with some embodiments.

DETAILED DESCRIPTION

Electronic devices may be provided with light-based components. The light-based components may include, for example, light-based proximity sensors. A light-based proximity sensor may have a light source such as an infrared light source and may have a light detector that detects whether light from the infrared light source has been reflected from an external object in the vicinity of an electronic device. Light sources may also be used as part of light-based transceivers, status indicator lights, displays, light-based touch sensors, light-based switches, and other light-based components. Illustrative configurations in which an electronic device is provided with a light-based component such as a light-based proximity sensor may sometimes be described herein as an example.

Figure 1:
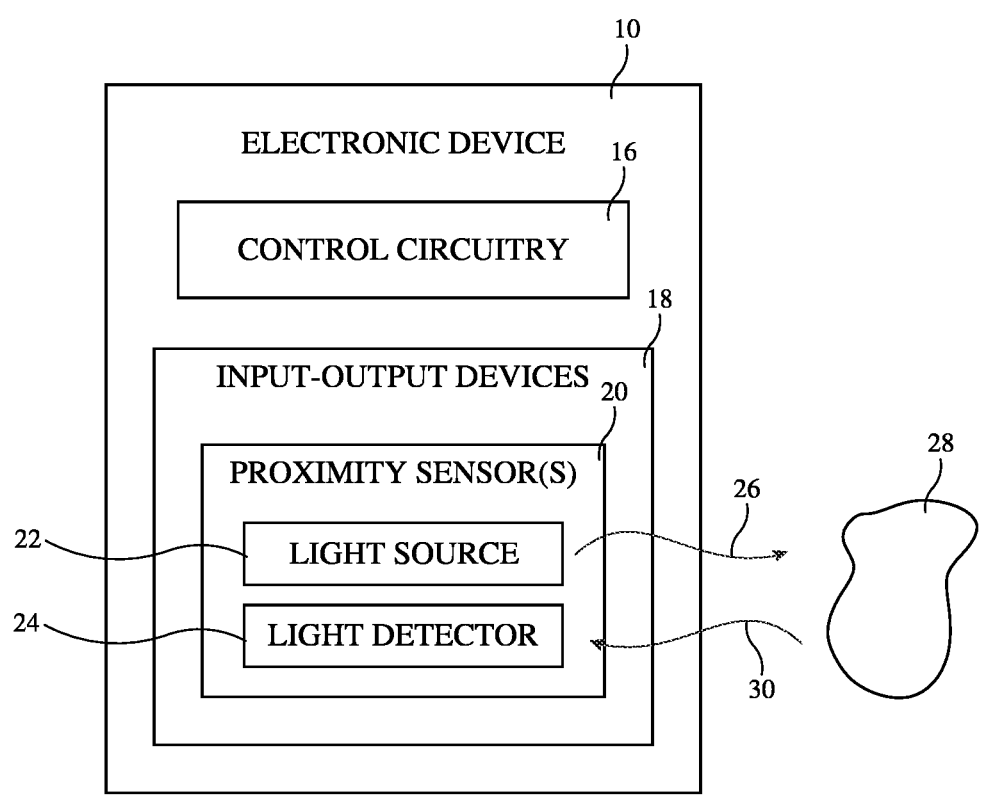
FIG. 1 is a schematic diagram of an illustrative electronic device in accordance with some embodiments.

FIG. 1 is a schematic diagram of an illustrative electronic device of the type that may include a light-based proximity sensor. Electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device such as a set of wireless or wired earbuds, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, an accessory (e.g., earbuds, a remote control, a wireless trackpad, etc.), or other electronic equipment.

As shown in FIG. 1, device 10 may include storage and processing circuitry such as control circuitry 16. Circuitry 16 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in circuitry 16 may be used to control the operation of device 10. This processing circuitry may be based on one or more microprocessors, microcontrollers, digital signal processors, baseband processor integrated circuits, application specific integrated circuits, other circuits with logic circuitry for producing digital control signals, etc.

Circuitry 16 may be used to run software on device 10. The software may control the operation of sensors and other components in device 10. For example, the software may allow circuitry 16 to control the operation of light-based proximity sensors and to take suitable actions based on proximity data gathered from the light-based proximity sensors. As an example, a light-based proximity sensor may be used to detect when a wireless earbud is in the ear of a user or may be used to detect when other user body parts are in the vicinity of an electronic device. Based on information on whether or not the earbud is in the ear of a user or is otherwise in a particular position relative to a user, the software running on control circuitry 16 may adjust audio output and/or media playback operations, may change the operation of communications functions (e.g., cellular telephone operations) for a paired cellular telephone or other additional device that is associated with the earbud, or may take other suitable action.

To support interactions with external equipment, circuitry 16 may be used in implementing communications protocols. Communications protocols that may be implemented using circuitry 16 include wireless local area network protocols (e.g., IEEE 802.11 protocols—sometimes referred to as WiFi®), protocols for other short-range wireless communications links such as the Bluetooth® protocol, cellular telephone protocols, near-field communications protocols, and other wireless communications protocols.

Device 10 may include input-output devices 18. Input-output devices 18 may be used to allow data to be supplied to device 10 and to allow data to be provided from device 10 to external devices. Input-output devices 18 may include touch screens, displays without touch sensor capabilities, buttons, joysticks, scrolling wheels, touch pads, key pads, keyboards, microphones, cameras, speakers, status indicators, light sources, audio jacks and other audio port components, light sensors, accelerometers, and other sensors, and input-output components. These components may include light-based components such as components with light sources. As shown in FIG. 1, device 10 may a light-based component such as one or more light-based proximity sensor(s) 20.

Proximity sensor 20 may include light source 22 and light detector 24. Light source 22 may emit light 26 that has the potential to be reflected from external objects such as object 28 (e.g., the ear or other body part of a user, inanimate objects, or other objects). Light detector 24 may measure how much of emitted light 26 is reflected towards device 10 as reflected light 30 and may therefore be used in determining whether an external object such as object 28 is present in the vicinity of device 10. Light 26 may be infrared light, visible light, or ultraviolet light. Infrared light is not visible to a user and is detectable by semiconductor infrared light detectors, so it may be desirable to form light source 22 from a component that emits infrared light. Light source 22 may be a light-emitting component such as a light-emitting diode or a laser diode (as examples). Proximity sensor 20 may output a proximity sensor reading (e.g., a proximity sensor output that is proportional to the distance between device 10 and object 28), and control circuitry 16 may monitor the proximity sensor reading and compare the proximity sensor reading to a predetermined threshold to detect proximity to external object 28.

Figure 2:
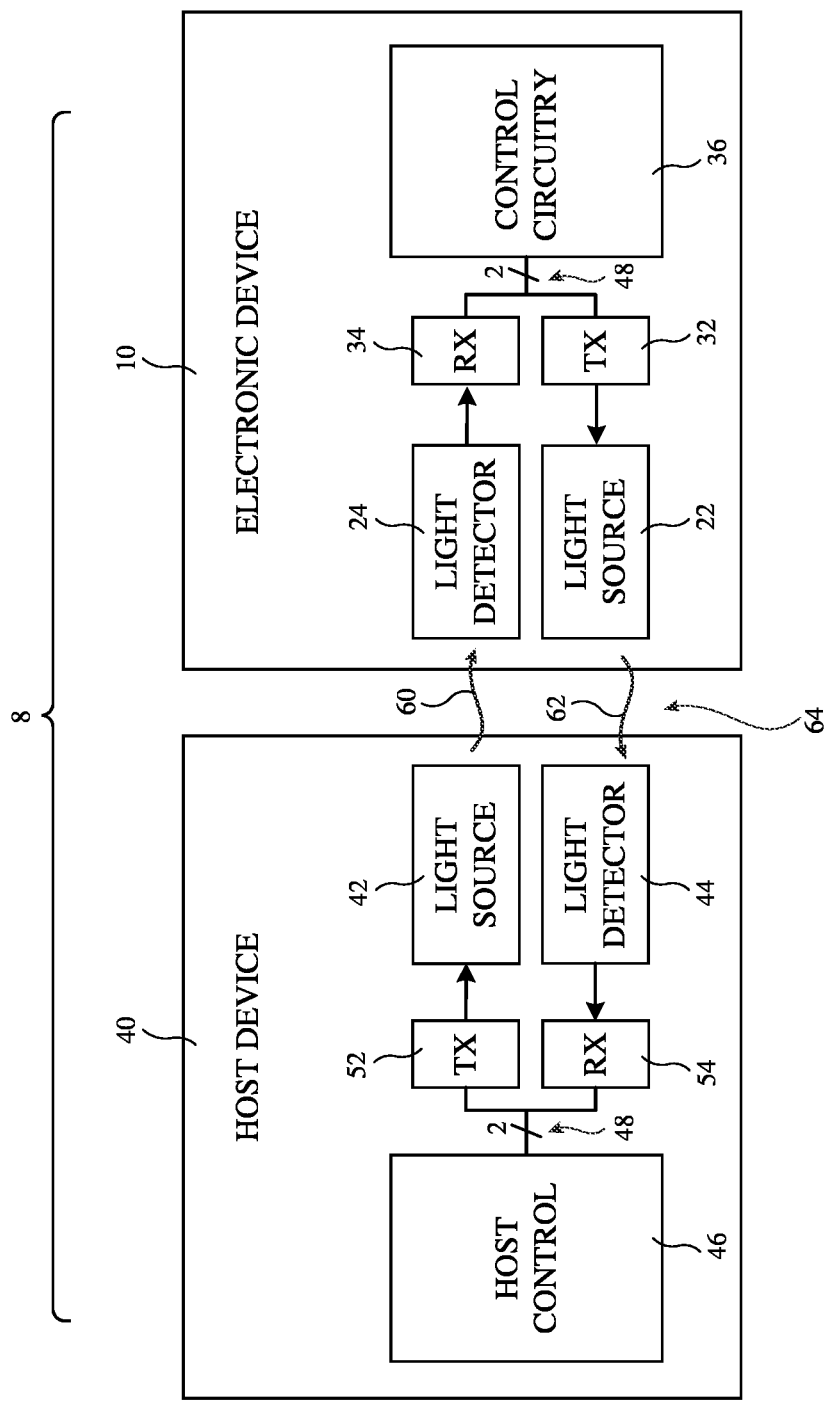
FIG. 2 is a diagram of an illustrative system having an electronic device operable to communicate with a host device with an optical interface in accordance with some embodiments.

Using light source 22 and light detector 24 solely for proximity sensing may be overly restrictive. In accordance with some embodiments, light-based (optical) proximity sensor 20 in device 10 may be reused as an optical communication interface. FIG. 2 is a diagram of an illustrative system such as system 8 with an electronic device 10 operable to communicate with a remote data source such as host device 40 via an optical communications interface. Reusing proximity sensor 20 in an optical communications interface in this way can allow the manufacturer or developer of device 10 to perform high-speed firmware updates or other high-speed communication operations with device 10. Device 10 may therefore operate in a proximity sensing mode during which proximity sensor 20 is used to detect proximity to an external object and in one or more data communications modes during which proximity sensor 20 is used to communicate with remote host device 40.

As shown in FIG. 2, device 10 may include light detector 24 (i.e., the same light detector component within proximity sensor 20 of FIG. 1), optical receiver circuitry 34 configured to receive signals from light detector 24, control circuitry 36 configured to receive decoded digital signals from receiver circuitry 34, optical transmitter circuitry 32 configured to receive digital signals for transmission from control circuitry 36, and light source 22 (i.e., the same light source component within proximity sensor 20 of FIG. 1) configured to receive signals from transmitter circuitry 32. Components 22, 24, 32, and 34 are sometimes referred to collectively as optical transceiver circuitry. Transmitter circuitry 32 may include optical encoding circuits, whereas receiver circuitry 34 may include optical decoding circuits. Circuitries 32, 34, and 36 and associated encoder and decoder circuits may all be referred to collectively as control circuitry (see, e.g., control circuitry 16 of FIG. 1).

Control circuitry 36 may be part of control circuitry 16 of FIG. 1 and may represent one or more systems on chip (SoCs), microcontrollers, microprocessors, digital signal processors, application specific integrated circuits, or other processing circuitry within device 10. In certain applications, communication with control circuitry 36 may be based on a 2-wire physical (PHY) layer protocol such as the embedded Universal Serial Bus (eUSB2) protocol. In the example of FIG. 2, the interface 38 between control circuitry 36 and the transmitter/receiver circuitries may therefore be a 2-wire differential signaling electrical interface having a positive data path (sometimes referred to as the "eD+" data path or pin) and a negative data path (sometimes referred to as the "eD−" data path or pin).

Electronic device 10 may communicate with a remote data source such as host device 40 by using light source 22 to send optical signals 62 to host device 40 and by using light detector 24 to receive optical signals 60 from host device 40 (e.g., devices 10 and 40 may communicate via an optical interface 64). Optical interface 64 may be a bidirectional communications interface and may be used to support handshaking, negotiations, or other operations associated with one or more optical communications protocol. Communications signals such as communications packets may be conveyed over optical interface 64. The communications packets may include associated synchronization information, start of packet or end of packet information, control information, status information, etc.

Host device 40 may include light a detector 44, optical receiver circuitry 54 configured to receive signals from light detector 44, host control circuitry 46 configured to receive decoded digital signals from host receiver circuitry 54, optical transmitter circuitry 52 configured to receive digital signals for transmission from host controller 46, and light source 42 configured to receive signals from host transmitter circuitry 52. Components 42, 44, 52, and 54 are sometimes referred to collectively as optical transceiver circuitry. Transmitter circuitry 52 may include optical encoding circuits, whereas receiver circuitry 54 may include optical decoding circuits.

Host control circuitry 46 may represent one or more host controllers, systems on chip (SoCs), microcontrollers, microprocessors, digital signal processors, application specific integrated circuits, or other host processor within device 40. Similar to device 10, communication with host controller 46 may be based on the 2-wire eUSB2 protocol (as an example). The interface 48 between control circuitry 46 and the associated transmitter/receiver circuitries 52/54 may therefore also be a 2-wire differential signaling electrical interface having positive data path eD+ and negative data path eD−. Illustrative configurations in which control circuitries 36 and 46 communicate with the associated optical transceiver circuitry using the 2-wire eUSB2 protocol are sometimes be described herein as an example. This is, however, merely illustrative.

If desired, control circuitries 36 and 46 may communicate with the optical transceiver (TX/RX) circuitry using any asynchronous electrical protocol such as USB, pulse density modulation (PDM), time-division multiplexing (TDM), universal asynchronous receiver-transmitter (UART), serial peripheral interface (SPI), and/or other physical interface standard where precise asynchronous electrical pin timing needs to be replicated across the optical link. Unlike other conventional communication systems that rely on embedded clocks, phase-locked loops, and clock data recovery circuits, a system that uses an asynchronous electrical protocol can often utilize simpler implementations with smaller sizes and reduced power consumption. If desired, other electrical interface protocols that uses two or more signals (wires) at interfaces 38 and 48 can also be used. Thus, for information to be conveyed from host controller 46 to control circuitry 36, the information needs to be converted from an electrical signal on interface 48 to an optical signal over the optical interface 64 between devices 10 and 40 and then back to an electrical signal on interface 38, and vice versa.

FIG. 3A is a conversion table showing an illustrative electrical-to-optical signal encoding scheme. The eUSB2 two-wire system can encode four symbols: a first symbol value of 0 indication no transitions (sometimes referred to herein as Symbol0), a second symbol value of 1 (sometimes referred to herein as Symbol1), a third symbol value of 2 (sometimes referred to herein as Symbol2), and a fourth symbol value of 3 (sometimes referred to herein as Symbol3). As shown in FIG. 3A, a transition from electrical bits "01" (where eD+ is low and eD− is high) to bits "10" (where eD+ is high and eD− is low) encodes a symbol value of 3, as shown by table entry 66. As another example, a transition from electrical bits "11" (where both eD+ and eD− are high) to bits "01" (where eD+ is low and eD− is high) encodes a symbol value of 2, as shown by table entry 67.

FIG. 3B is a conversion table showing an illustrative optical-to-electrical signal decoding scheme. As shown in FIG. 3B, if the previous electrical bits is equal to "10" (where eD+ is high and eD− is low) and if the incoming optical signal has a symbol value of 1, then this decodes to corresponding electrical bits "00" (where both eD+ and eD− are low), as shown by table entry 68. As another example, if the previous electrical bits is equal to "00" (where both eD+ and eD− are low) and if the incoming optical signal has a symbol value of 3, then this decodes to corresponding electrical bits "11" (where both eD+ and eD− are high), as shown by table entry 69. The electrical-to-optical encoding and decoding schemes shown in FIGS. 3A and 3B are merely illustrative. If desired, other types of encoding/decoding schemes having more than four or less than four symbols can also be implemented.

Figure 4:
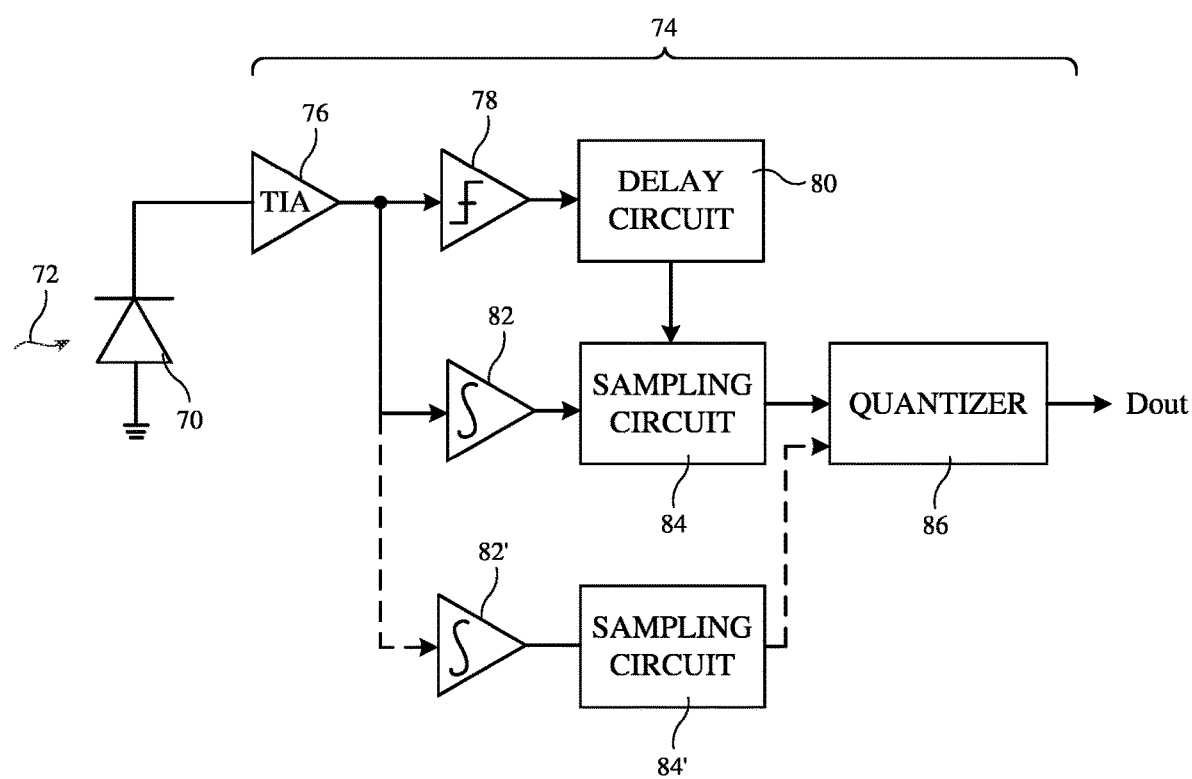
FIG. 4 is a diagram of illustrative optical receiver circuitry in accordance with some embodiments.

FIG. 4 is a diagram of illustrative optical receiver circuitry configured to perform decoding schemes of the type described in connection with FIG. 3B in accordance with some embodiments. As shown in FIG. 4, a light detector (sometimes referred to as a photodetector) such as photodiode 70 may detect optical signals 72 and produce corresponding charge in the form of a current to associated receiver circuitry 74. Photodiode 70, which may represent the same photodetector 24 in FIG. 1, may sometimes be considered part of the optical receiver (RX) circuitry. Receiver circuitry 74 may include an amplifying circuit such as amplifier 76, a digital slicer circuit such as slicer 78, a delay circuit such as delay circuit 80, an integrating circuit such as integrator 82, a data sampling circuit such as sampler 84, and a data quantizing circuit such as quantizer 86. If the delay of quantizer 86 is not fixed, a fixed delay can be added to the delay circuit 80 to re-time the quantizer output so that Dout maintains a constant delay from slicer 78.

Amplifier 76 may, for example, be a transimpedance amplifier configured to convert the current signal generated by photodiode 70 to a corresponding voltage signal. Slicer 78 monitors the output of amplifier 78 and sets an initial threshold level for detecting whether a valid signal is present and filtering out the noise floor. Slicer 78 detects a rising edge and/or a falling edge of the pulse signal (e.g., by detecting when the optical signal rises above or falls below the threshold level). Slicer 78 is therefore sometimes referred to as a data thresholding circuit. In response to detecting a signal, slicer 78 may reset integrator 82 so that integrator 82 can start integrating from zero. Delay circuit 80 may be coupled at the output of slicer 78 and sets an integration period for integrator 82 following the reset operation. Integrator 82 is configured to integrate a voltage signal from the output of amplifier 76 and outputs a corresponding analog integrated value. Sampler 84 is configured to sample the integrated value at the output of integrator 82 after a delay period set by delay circuit 80 following the reset. Quantizer 86 may, for example, be an analog-to-digital converter (ADC) configured to convert or extract the sampled value output from sampler 84 to a digital code. Quantizer 86 outputs digital results to distinguish between different optical signals for decoding. If desired, amplifier 76 and integrator 82 may optionally be merged into a single amplifier circuit.

As described above, sampler 84 is configured to sample the integrated signal at the end of the delay (integration period) set by delay circuit 80. If desired, the receiver circuitry may optionally sample the integrated signal at an earlier point in time after the reset operation for normalized detection.

Figure 5:
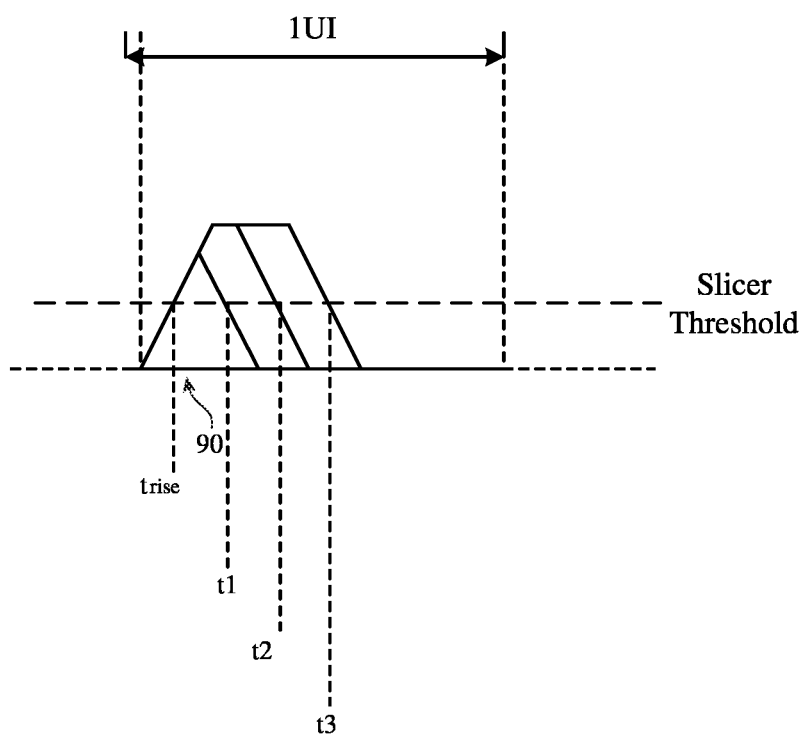
FIG. 5 is a timing diagram showing an illustrative optical encoding scheme using pulse width modulation (PWM) in accordance with some embodiments.

The optical receiver circuitry shown in FIG. 4 may be used to detect both pulse width modulated (PWM) and/or normalized amplitude modulated (NAM) optical signal waveforms. FIG. 5 is a timing diagram showing an illustrative pulse width modulation (PWM) encoding scheme in accordance with some embodiments. As shown in FIG. 5, optical pulses of different pulse widths within one unit interval (UI) can be used to encode different symbol values. As examples, one unit interval may be equal to 80 ns, 70-90 ns, 60-100 ns, less than 80 ns, more than 80 ns, 1-100 ns, 100-200 ns, or other suitable duration.

The rising edge of the optical signal can be detected using slicer 78 of FIG. 4 (e.g., by detecting when the signal rises above the initial slicer threshold, as indicated by time trise). A falling edge at time t1 sets a short pulse width, which effectively stops the integrated signal from increasing further after time t1, translating to a symbol value of 1 (Symbol1). A falling edge at time t2 sets a medium pulse width, which effectively stops the integrated signal from increasing further after time t2, translating to a symbol value of 2 (Symbol2). A falling edge at time t3 sets a long pulse width, which effectively stops the integrated signal from increasing further after time t3, translating to a symbol value of 3 (Symbol3). A symbol value of 0 (Symbol0) is encoded by a complete lack of transitions (sometimes referred to as a dark signal), as indicated by waveform 90. The example of FIG. 5 in which optical signals of three different pulse widths are used to encode multiple symbol values is merely illustrative. If desired, optical signals having more than three or less than three pulse widths can be used to encode any desired number of symbols.

Figure 6:
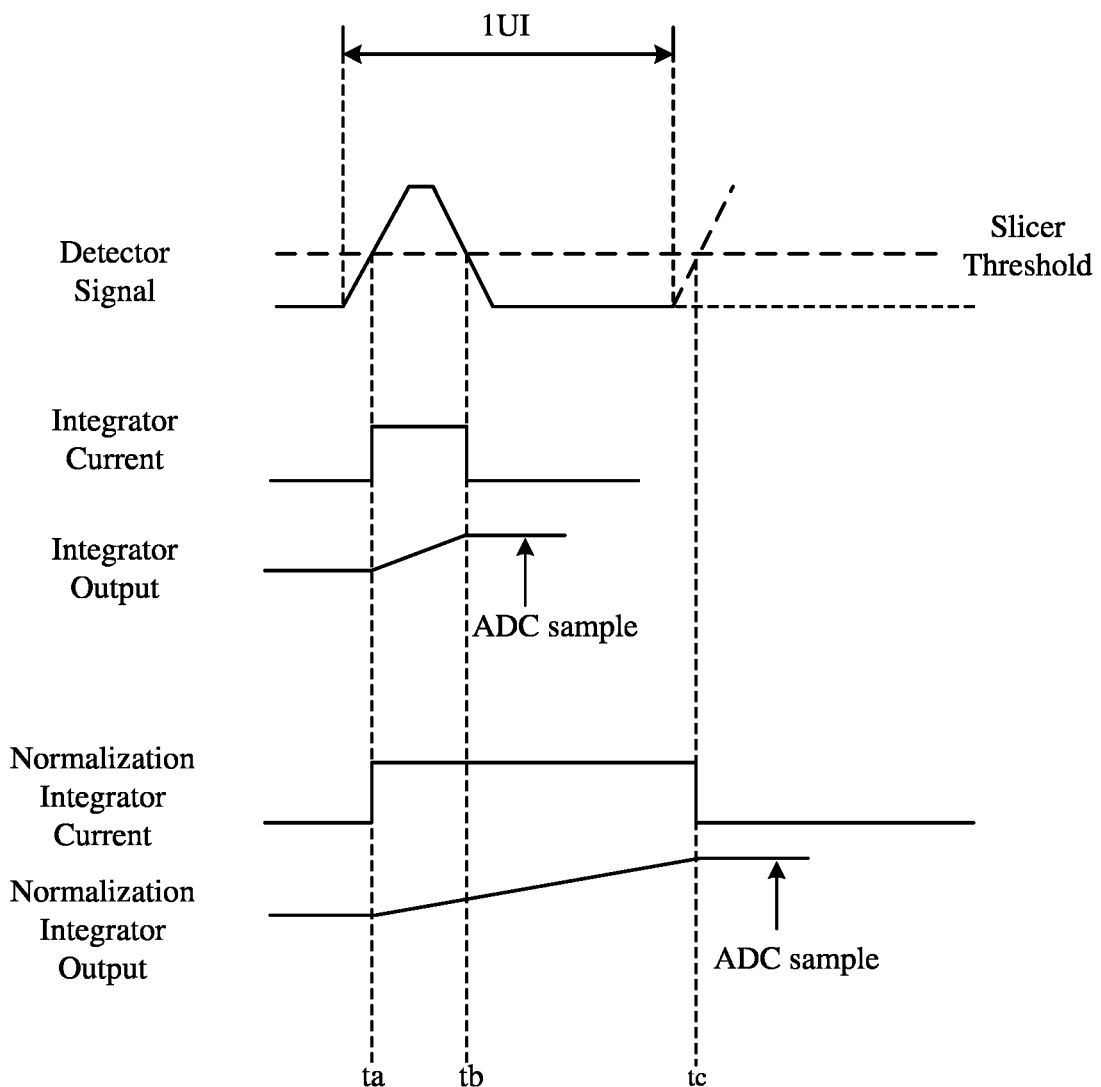
FIG. 6 is a timing diagram showing an illustrative pulse width detection scheme in accordance with some embodiments.

FIG. 6 is a timing diagram illustrating a pulse width detection scheme that can be used to decode the PWM encoding scheme of FIG. 5. As shown in FIG. 6, the detector signal may represent either a current value at the input of amplifier 76 or a voltage value at the output of amplifier 76. The integrator current may represent a value that is being integrated by integrator 82. The integrator current starts at the rising edge (at time ta) of the detector signal and terminates at the falling edge (at time tb) of the detector signal, as detected using the slicer. Operated in this way, the final integrated value will be proportional to the pulse width of the optical signal. The integrator output waveform represents the integrated value generated at the output of integrator 82. Sampler 84 then samples the integrator output sometime after the falling edge.

If desired, a separate integrator (see, e.g., integrator 82' in FIG. 4) can be used to detect one unit interval for pulse width normalization. The normalization integrator current may represent a value that is being integrated by integrator 82'. The normalization integrator current starts at the rising edge (at time ta) of the detector signal and terminates at the subsequent rising edge (at time tc) of the detector signal, as detected using the slicer. Operated in this way, the final integrated value at the output of integrator 82' will be proportional to the duration of one unit interval (1UI). The normalization integrator output waveform represents the integrated value generated at the output of integrator 82'. A separate sampler (see, e.g., sampler 84') can then sample the normalization integrator output sometime after time tc. A ratio of the two sampled values can then be computed by quantizer 86 (i.e., to obtain a normalized value) to help reduce potential environmental and processing variations. This decoding method can therefore sometimes be referred to as a normalized PWM detection scheme.

In general, the optical signal generated by the photodetector has two time constants, a first of which is dominated by the total capacitance at the output of the photodetector and a second of which is dominated by diffusion times associated with the photodetector. Long diffusion times can contribute to longer tail periods before the signal completely settles. In accordance with some embodiments, the PWM encoding scheme can be equalized by regulating the optical signal to an average current (or voltage) level.

Figure 7:
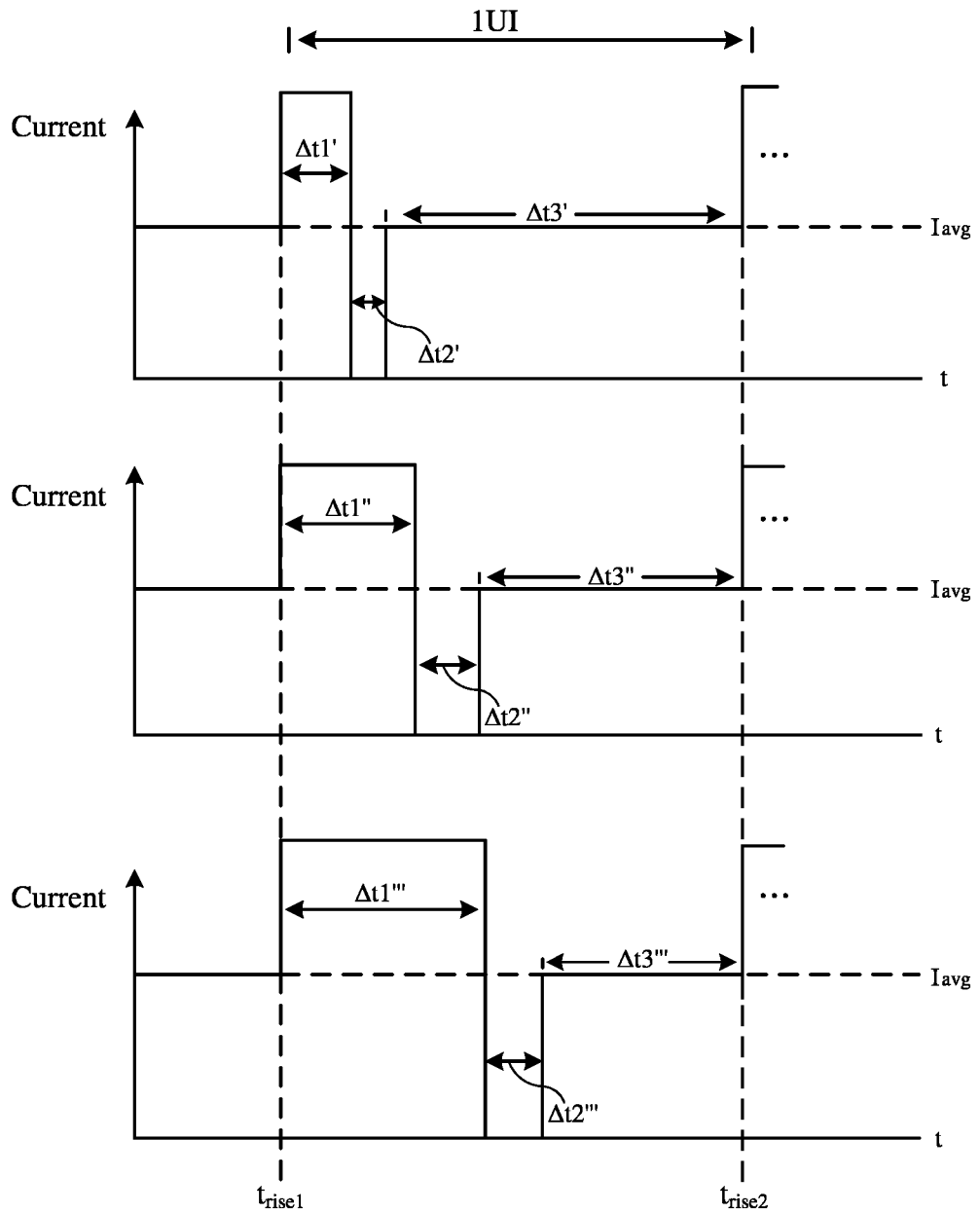
FIG. 7 is a timing diagram showing an illustrative optical encoding scheme using pulse width modulation (PWM) with equalization in accordance with some embodiments.

FIG. 7 is a timing diagram illustrating an equalized PWM encoding scheme in accordance with some embodiments. As shown in FIG. 7, the photodetector current signal may always revert back to an average non-zero current level Iavg. The top waveform shows a short positive pulse $\Delta t1'$ for encoding Symbol1, followed by a negative pulse $\Delta t2'$. The negative pulse helps to reset the long diffusion tail by forcing the signal below the average value Iavg. Period $\Delta t3'$ is the time period for the optical signal to return to the average value Iavg. The sum of $\Delta t1'$, $\Delta t2'$, and $\Delta t3'$ is equal to one unit interval. A symbol value of 0 (Symbol0) is encoded by a complete lack of transitions (sometimes referred to as a dark symbol), so the signal will remain unchanged at the Iavg level. Modulating around Iavg in this way helps mitigate the impact of the slow diffusion time constant, minimizes cycle-to-cycle jitter, and reduces inter-symbol interference.

The middle waveform shows a medium positive pulse $\Delta t1''$ for encoding Symbol2, followed by a negative pulse $\Delta t2''$. The negative pulse helps to reset the long diffusion tail by forcing the signal below the average value Iavg. Period $\Delta t3''$ is the time period for the optical signal to return to the average value Iavg. The sum of $\Delta t1''$, $\Delta t2''$, and $\Delta t3''$ is equal to one unit interval. Modulating around Iavg in this way helps mitigate the impact of the slow diffusion time constant, minimizes cycle-to-cycle jitter, and reduces inter-symbol interference.

The bottom waveform shows a long positive pulse $\Delta t1'''$ for encoding Symbol3, followed by a negative pulse $\Delta t2'''$. The negative pulse helps to reset the long diffusion tail by forcing the signal below the average value Iavg. Period $\Delta t3'''$ is the time period for the optical signal to return to the average value Iavg. The sum of $\Delta t1'''$, $\Delta t2'''$, and $\Delta t3'''$ is equal to one unit interval. Modulating around Iavg in this way helps mitigate the impact of the slow diffusion time constant, minimizes cycle-to-cycle jitter, and reduces intersymbol interference.

Figure 8:
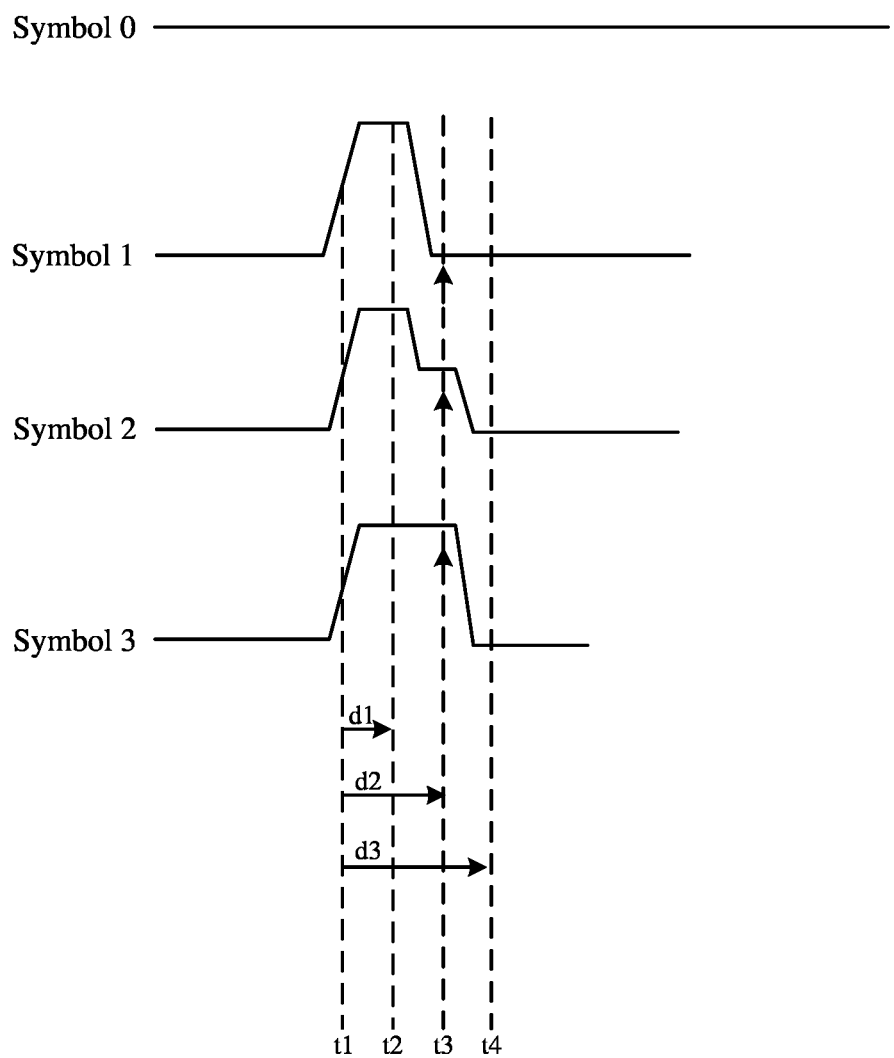
FIG. 8 is a timing diagram showing an illustrative optical encoding/decoding scheme using normalized amplitude modulation (NAM) in accordance with some embodiments.

The embodiments of FIGS. 5-7 relating to a PWM encoding/decoding scheme is merely illustrative. The optical receiver circuitry shown in FIG. 4 may also be used to detect amplitude modulated signal waveforms. FIG. 8 is a timing diagram illustrating an amplitude modulation encoding/decoding scheme in accordance with other embodiments. As shown in FIG. 8, a signal lacking any transitions is indicative of Symbol0. The receiver circuitry may detect a rising edge at time t1. After a first delay period d1, the receiver circuitry may obtain a first sample at time t2. The first sampled value sets a full amplitude baseline value.

After a second delay period d2 following the rising edge, the receiver circuitry may obtain a second sample at time t3. The second sampled value determines which symbol is currently being decoded. A low sampled value may correspond to Symbol1. A medium or intermediate sampled value may correspond to Symbol2. A high sampled value may correspond to Symbol3. After a third delay period d3 following the rising edge, the receiver circuitry may obtain a third sample at time t4. The third sample having a low value confirms the end of the optical pulse.

In practice, the amplitude of an optical signal can vary depending on the optical alignment between two devices and the optical power level. To help reduce the effect of such variations, the second sampled value at time t3 may be compared with the first sampled value at time t2 (indicative of the full amplitude baseline level). For example, the receiver circuitry may compute a ratio of the second sampled value to the first sampled value. A computed ratio of less than ¼ decodes to Symbol1. A computed ratio of greater than ¼ and less than ¾ decodes to Symbol2. A computed ratio of greater than ¾ decodes to Symbol3. An amplitude modulation scheme that compares to a full-amplitude baseline level is sometimes referred to as a normalized amplitude modulation (NAM) scheme or a normalized amplitude detection scheme. The normalized amplitude modulation scheme may have lower bandwidth requirements relative to other modulation schemes such as the pulse width modulation scheme.

Figure 9:
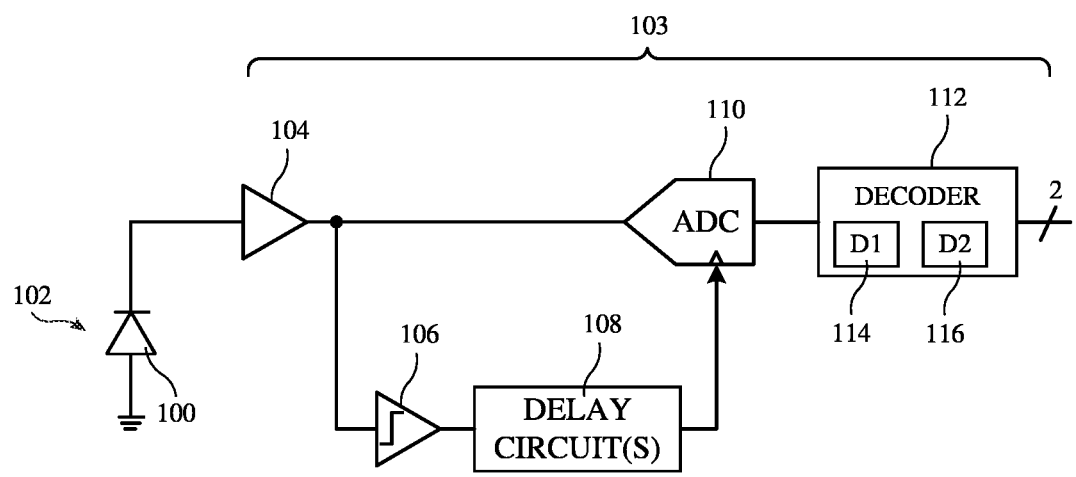
FIG. 9 is a diagram of illustrative optical receiver circuitry operable to support the normalized amplitude modulation (NAM) decoding scheme shown in FIG. 8 in accordance with some embodiments.

FIG. 9 is a diagram showing one suitable implementation of optical receiver circuitry operable to support the normalized amplitude modulation (NAM) decoding/detection scheme shown in FIG. 8. As shown in FIG. 9, the receiver circuitry may include a photodetector such as photodiode 100, an amplifying circuit such as amplifier 104, a data slicing (thresholding) circuit such as slicer 106, a delay circuit such as delay circuit 108, a data converter such as analog-to-digital converter 110, and decoding circuit such as decoder 112. Photodiode 100 may detect optical signals 102 and produce corresponding charge in the form of a current to the associated receiver circuitry 103. Photodiode 100, which may represent the same photodetector 24 in FIG. 1, can sometimes be considered part of the optical receiver (RX) circuitry 103.

Amplifier 104 may, for example, be a programming gain amplifier configured to convert the current signal generated by photodiode 100 to a corresponding voltage signal. Slicer 106 monitors the output of amplifier 104 and sets an initial threshold level for detecting whether a valid signal pulse is present and for filtering out the noise floor. Delay circuit 108 may include one or more delay cells configured to output pulses at various time intervals directing data converter 110 to sample the output of amplifier 104. Converter 110 may be a 4-bit flash ADC (as an example). In general, ADC 110 can have a 3-bit resolution, a 5-bit resolution, 3-10 bits of resolution, or other suitable resolution.

Decoder 112 may include a first decoding sub-circuit 114 and a second decoding sub-circuit 116. The first decoding sub-circuit 114 is a symbol decoder that computes the ratio of the two sampled values and determines the corresponding symbol value. The second decoding sub-circuit 116 is an optical symbol to electrical signal decoder that receives the decoded symbol value from sub-circuit 114 and outputs the eD+ and eD− bits by using a conversion table such as the table of FIG. 3B.

Figure 10:
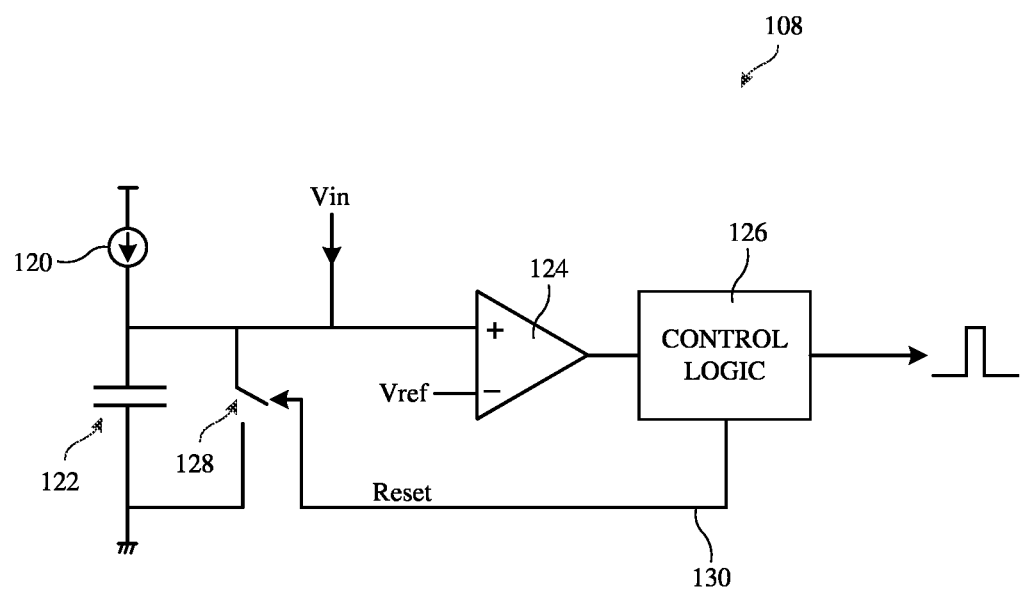
FIG. 10 is a diagram of an illustrative delay circuit in accordance with some embodiments.

FIG. 10 is a diagram of illustrative delay circuit 108. As shown in FIG. 10, delay circuit 108 may include a current source 120, a capacitor 122 coupled in series with current source 120 between a positive power supply terminal and a ground terminal, a reset switch 128 coupled across capacitor 122, a comparator 124 having a first (positive) input terminal coupled to a node between current source 120 and capacitor 122, a second (negative) input terminal configured to receive a reference voltage Vref, and a comparator output, and a control logic 126 that receives signals from the comparator output and generates pulses that are fed to ADC 110. Delay circuit 108 receives an input voltage Vin from the output of slicer 106. Control logic 126 may include a counter that outputs a pulse whenever certain delay thresholds have been reached. Control logic 126 may also be used to activate switch 128 to reset the voltage across capacitor 122. The reset voltage may optionally have a longer delay than the output pulse. A delay circuit arranged in this way can output pulses at various time intervals to trigger the sampling of signals (e.g., to trigger sampling at times t2, t3, and t4 as shown in FIG. 8).

Figure 11:
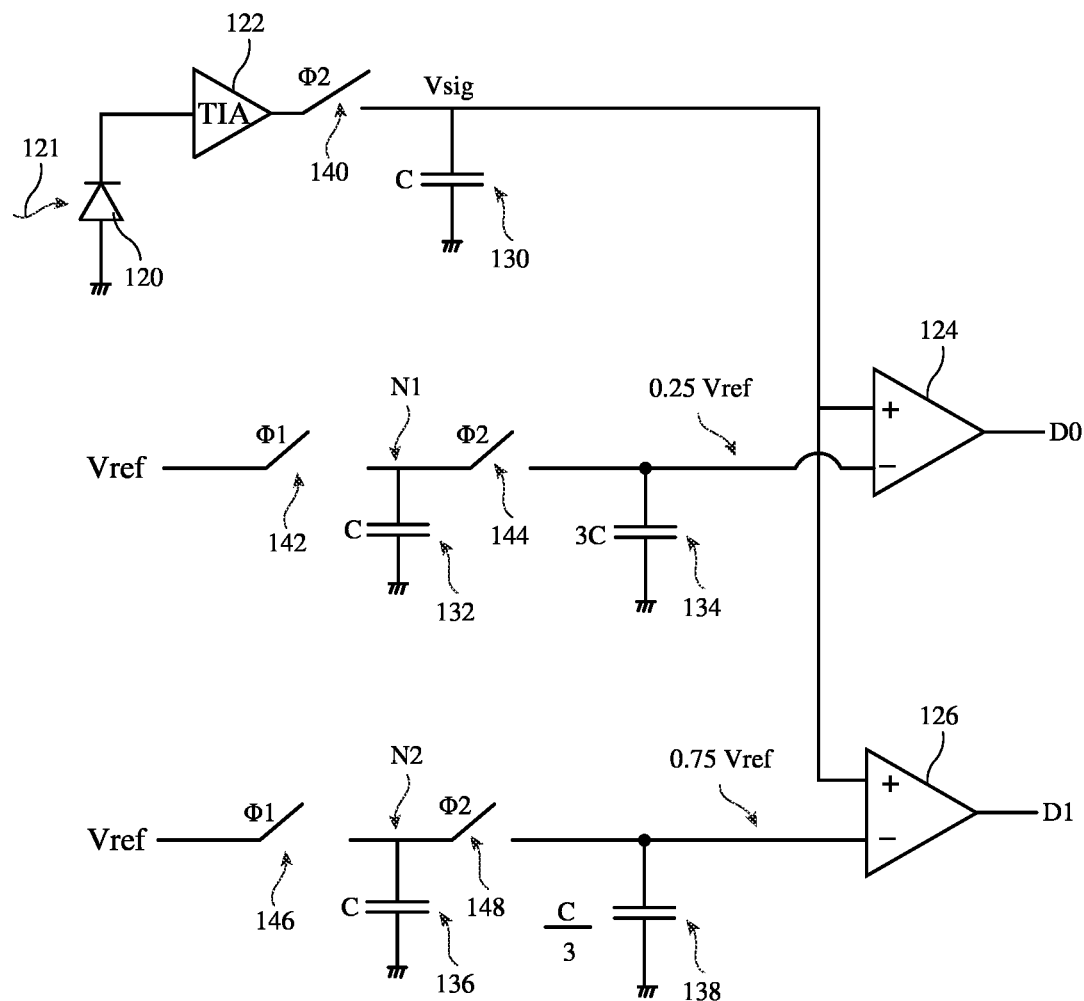
FIG. 11 is a diagram showing another implementation of optical receiver circuitry operable to support the normalized amplitude modulation (NAM) decoding scheme of FIG. 8 in accordance with some embodiments.

The example of FIG. 9 in which the optical receiver circuitry is implemented using a flash ADC is merely illustrative. FIG. 11 shows another suitable embodiment of optical receiver circuitry implemented using two comparators and associated charge sharing components. As shown in FIG. 11, the receiver circuitry includes photodiode 120, an amplifier circuit such as amplifier 122 (e.g., a transimpedance amplifier for converting a current signal to a voltage signal), a first comparator 124, a second comparator 126, capacitors 130, 132, 134, 136, and 138, and switches 140, 142, 144, 146, and 148. Photodiode 120 may detect optical signals 121 and produce corresponding charge in the form of a current to the associated receiver circuitry. Photodiode 120, which may represent the same proximity sensor photodetector 24 in FIG. 1, can sometimes be considered part of the optical receiver (RX) circuitry.

Amplifier 122 has an amplifier output that is selectively coupled to the positive (+) input terminals of comparator 124 and comparator 126 via switch 140. Capacitor 130 may be coupled to the positive input terminals of comparators 124 and 126. Configured in this way, when switch 140 is activated, a voltage signal Vsig proportional to the optical signal 121 produced by photodiode 120 will charge up capacitor 130.

Capacitor 132 has a first terminal (marked as node N1) selectively coupled to a reference voltage Vref via switch 142 and has a second terminal connected to ground. Capacitor 134 has a first terminal selectively coupled to node N1 via switch 144 and has a second terminal connected to ground. Comparator 124 has a negative (−) input terminal coupled to the first terminal of capacitor 134.

Capacitor 136 has a first terminal (marked as node N2) selectively coupled to reference voltage Vref via switch 146 and has a second terminal connected to ground. Capacitor 138 has a first terminal selectively coupled to node N2 via switch 148 and has a second terminal connected to ground. Comparator 126 has a negative (−) input terminal coupled to the first terminal of capacitor 138. Comparator 124 has an output on which bit D0 is generated, whereas comparator 126 has an output on which bit D1 is generated. Bits D0 and D1 may be fed to an optical decoder such as decoder 122 of the type described in connection with FIG. 9.

Figure 12:
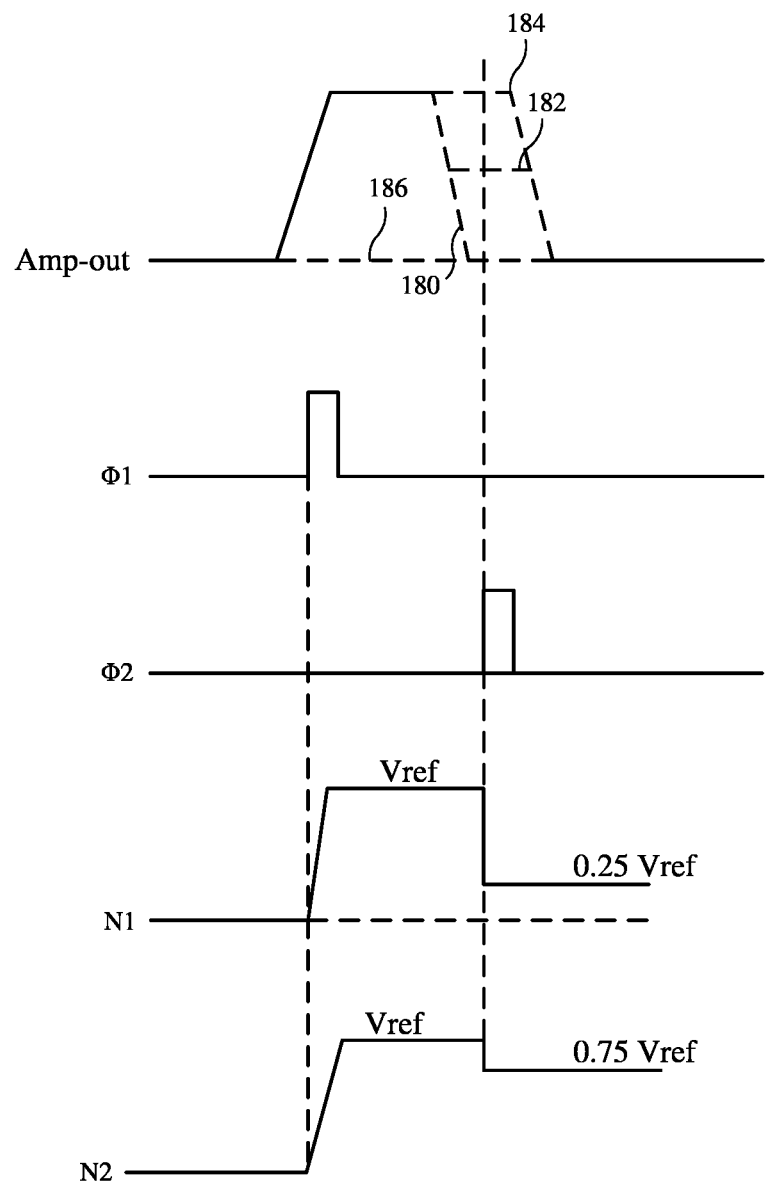
FIG. 12 is a timing diagram showing illustrative waveforms involved in operating the optical receiver circuitry of FIG. 11 in accordance with some embodiments.

The operation of the optical receiver circuitry of FIG. 11 is illustrated by the timing diagram of FIG. 12. The Amp_out waveform shows the voltage at the output of amplifier 122. After the rising edge of Amp_out, signal Φ1 may be pulsed high to temporarily activate switches 142 and 146 to charge capacitors 132 and 136, respectively, to reference voltage Vref. This is shown in FIG. 12 by nodes N1 and N2 both rising to the Vref level following the Φ1 pulse.

The Amp_out waveform may then toggle depending on the encoded optical symbol. An Amp_out dropping to a low voltage as shown by waveform 180 is indicative of Symbol1. An Amp_out dropping to a medium voltage as shown by waveform 182 is indicative of Symbol2. An Amp_out staying high as shown by waveform 184 is indicative of Symbol3. Symbol0 may be encoded by a constant low voltage without any transitions, as shown by waveform 186.

Thereafter, signal Φ2 may be pulsed high to temporarily activate switches 140, 144, and 148. Activating switch 140 passes the Amp_out voltage as Vsig onto the positive input terminals of comparators 124 and 126. Activating switch 144 causes the charge stored on capacitor 132 to be shared with capacitor 134. By sizing capacitor 134 to be three times the size of capacitor 132, the final voltage at the negative terminal of comparator 124 will be equal to 0.25*Vref after charge sharing (redistribution), as shown by the voltage level of node N1 following the Φ2 pulse. Activating switch 148 causes the charge stored on capacitor 136 to be shared with capacitor 138. By sizing capacitor 138 to be only ⅓ the size of capacitor 136, the final voltage at the negative terminal of comparator 126 will be equal to 0.75*Vref after charge redistribution, as shown by the voltage level of node N2 following the Φ2 pulse.

These threshold levels enable comparators 124 and 126 to determine whether signal Vsig is less than 0.25Vref, between 0.25Vref and 0.75Vref, or greater than 0.75Vref. If Vsig is less than 0.25Vref (as is the case for waveform 180 in FIG. 12), then D0 and D1 at the outputs of comparators 124 and 126 will both be high. If Vsig is between 0.25Vref and 0.75Vref (as is the case for waveform 182 in FIG. 12), then D0 and D1 will be equal to low and high, respectively. If Vsig is greater than 0.75Vref (as is the case for waveform 184 in FIG. 12), then D0 and D1 will both be low. This method of quantizing signals by comparing Vsig to different reference levels in this way can sometimes also be referred to as a normalized amplitude modulation scheme.

The example of FIG. 12 in which the optical receiver circuitry includes two comparators operating in parallel is merely illustrative. If desired, the optical receiver circuitry may include a single comparator operated in conjunction with a successive charge sharing scheme. In such embodiment, charge sharing can occur to first generate 0.75Vref followed by a first comparison by the comparator to generate bit D1. Thereafter, another charge sharing can occur to generate 0.25Vref followed by a second comparison by the comparator to generate bit D0. Performing successive charge sharing and comparison using only one comparator to generate bits D1 and D0 in a time multiplexed fashion saves circuit area.

Figure 13:
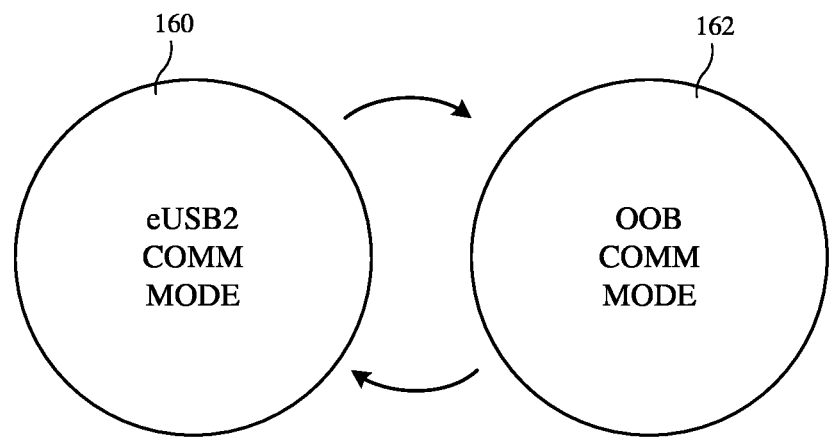
FIG. 13 is a state diagram showing at least two different optical communications modes in accordance with some embodiments.

The embodiments of FIGS. 3-12 in which the optical transmitter and receiver circuitries are configured to support high speed eUSB2-type communications is merely illustrative. In some embodiments, the optical transceiver may be operable to support at least two different modes of communications. FIG. 13 is a state diagram showing at least two different optical communications modes in accordance with some embodiments. As shown in FIG. 13, the optical transceiver circuitry may be operable in a first optical communications mode 160 and a second optical communications mode 162. When operated in the first optical communications mode 160, the optical transceiver circuitry may carry out high speed communications using the eUSB2 protocol, where optical symbol pulses are shorter than one unit interval. Such type of communications might be useful for performing quick firmware updates (as an example).

In contrast to the first optical communications mode 160 in which optical pulses are shorter than one unit interval, the second optical communications mode 162 transmits optical pulses that are longer than one unit interval. The second optical communications mode 162 is therefore sometimes referred to herein as an out-of-band (OOB) optical communications mode. The first optical communications mode 160 can therefore sometimes be referred to herein as an in-band optical communications mode. The transfer rate of communications mode 162 may be lower than that of communication mode 160, which may be suitable for chip-to-chip communications such as for performing chip configuration, calibrating optical power, or other types of lower speed communications.

Figure 14:
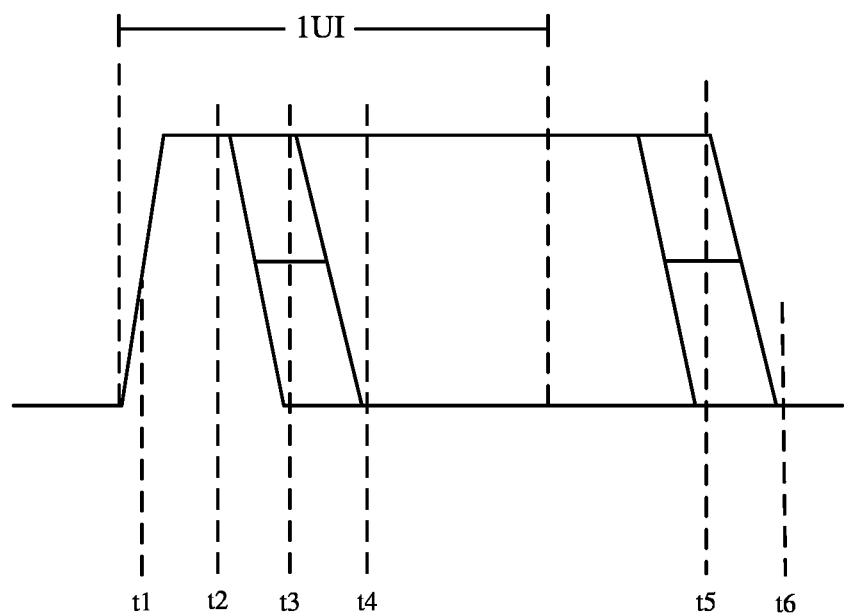
FIG. 14 is a timing diagram showing an illustrative optical encoding/decoding scheme that can be used to support the two different optical communications modes of FIG. 13 in accordance with some embodiments.

FIG. 14 is a timing diagram showing an illustrative optical encoding/decoding scheme that can be used to support modes 160 and 162. In the example of FIG. 14, a normalized amplitude modulation scheme is used for both in-band and out-of-band communications modes. This is, however, merely illustrative. If desired, a (normalized) pulse width modulation scheme as described in connection with FIG. 5 or an equalized pulse width modulation scheme as described in connection with FIG. 7 can be used for both modes 160 and 162. The circuits of FIGS. 4, 9, and 11 can be used to support modes 160 and 162.

As shown in FIG. 14, the rising optical pulse edge can be detected at time t1 (e.g., using a slicer circuit). A first sample can be obtained at time t2 to acquire a full amplitude baseline level. A second sample can be obtained at time t3 to acquire and decode an incoming symbol value for the eUSB2 communication. A third sample can then be obtained at time t4. The value of the third sample can be used to distinguish between eUSB2 communications and OOB communications. If the third sample is low, then the pulse width is within one UI, which is indicative of eUSB2 (in-band) communications. If the third sample is high, then the pulse width will be greater than one UI, which is indicative of non-USB (out-of-band) communications.

A fourth sample can then be obtained at time t4 to acquire and decode a symbol value for the OOB communication. A low sampled value corresponds to Symbol1. A medium or intermediate sampled value corresponds to Symbol2. A high sampled value corresponds to Symbol3. A fifth sample can then be obtained at time t5 to confirm the end of the OOB pulse. A low fifth sample is indicative of correct communication. A high fifth sample may be indicative of a communications error, a potential laser safety violation, or other communications defect.

Figure 15:
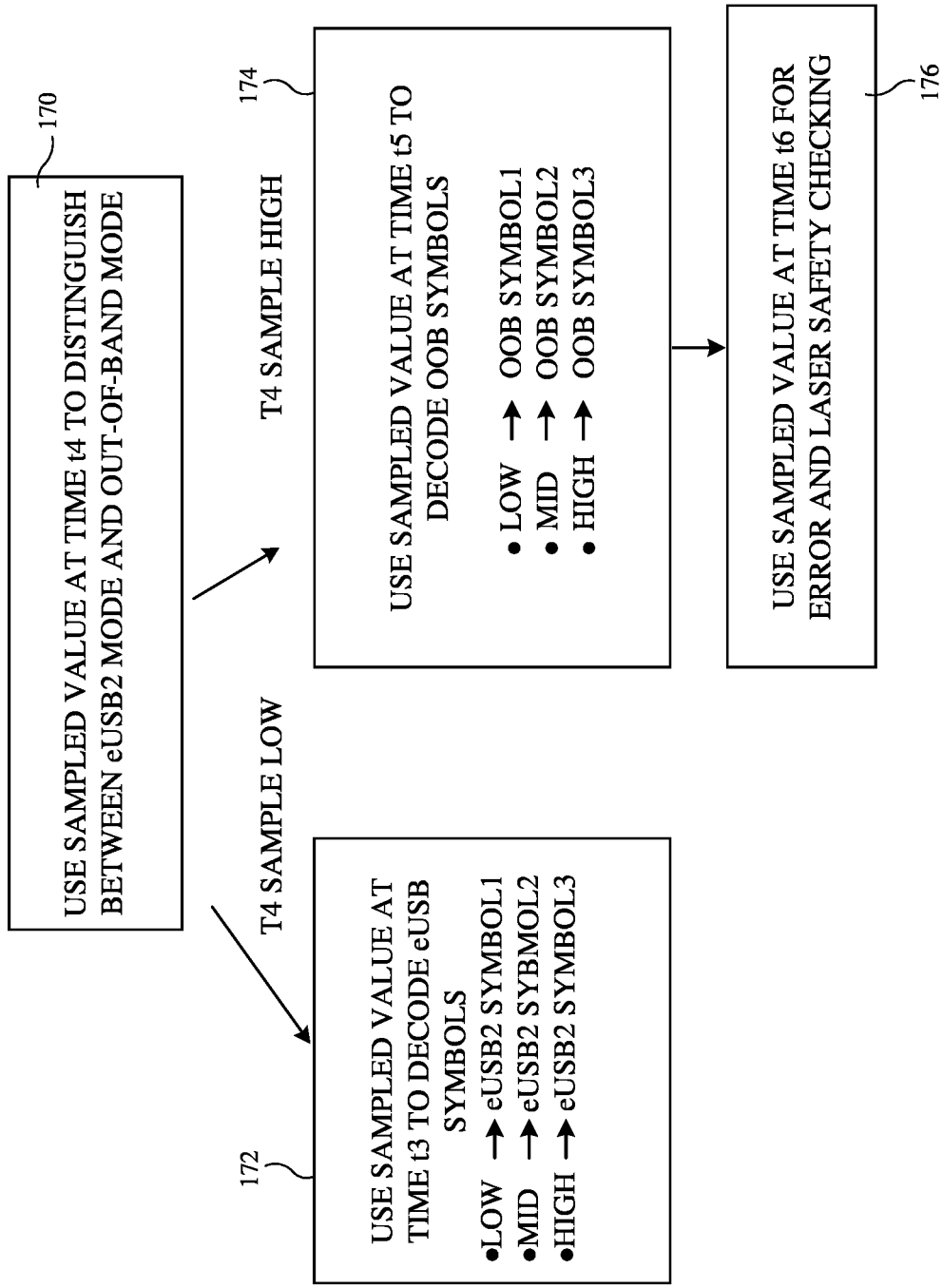
FIG. 15 is a flow chart of illustrative operations for performing the two different optical communications modes of FIGS. 13 and 14 in accordance with some embodiments.

FIG. 15 is a flow chart of illustrative steps for operating the optical transceiver circuitry in modes 160 and 162. During the operations of block 170, the decoder in the receiver device may use the sampled value at time t4 (see FIG. 14) to distinguish between eUSB2 mode 160 and OOB mode 162. This determination step at block 170 is sometimes referred to as a protocol check (e.g., to check whether the pulse is shorter or longer than one unit interval).

If the sampled value is low, then the sampled value at time t3 may be used to decode the eUSB2 symbols, as shown by the operations of block 172. A low sampled value at time t3 corresponds to Symbol1. A medium sampled value at time t3 corresponds to Symbol2. A high sampled value at time t3 corresponds to Symbol3.

If the sampled value at time t4 is high, then the decoder knows the optical signals are being transmitted in the OOB mode. During the operations of block 174, the decoder may use the sampled value at time t5 to decode the OOB symbols. A low sampled value at time t5 corresponds to Symbol1. A medium sampled value at time t5 corresponds to Symbol2. A high sampled value at time t5 corresponds to Symbol3. During the operations of block 176, the decoder may use the sampled value at time t6 for error and/or laser safety checking.

The foregoing is merely illustrative and various modifications can be made to the described embodiments. The foregoing embodiments may be implemented individually or in any combination.

What is claimed is:

1. An electronic device configured to detect proximity to an external object and to communicate with a remote data source that transmits optical data, comprising:
   a proximity sensor having a light source configured to emit light and having a light detector configured to:
     measure the emitted light reflecting off the external object; and
     receive the optical data from the remote data source;
   an amplifier circuit having an input coupled to the light detector and configured to produce an output signal;
   a data slicer circuit having an input configured to receive the output signal from the amplifier circuit; and
   an integrating circuit having an input configured to receive the output signal from the amplifier circuit.

2. The electronic device of claim 1, further comprising: receiver circuitry configured to decode the optical data.

3. The electronic device of claim 2, wherein the optical data includes a pulse signal, and wherein the receiver circuitry is configured to decode the optical data by detecting a pulse width of the pulse signal.

4. The electronic device of claim 2, wherein the receiver circuitry is configured to decode the optical data using a normalized pulse width modulation detection scheme.

5. The electronic device of claim 2, wherein the optical data is regulated to an average non-zero value to reduce inter-symbol interference.

6. The electronic device of claim 2, wherein the optical data includes a pulse signal, and wherein the receiver circuitry is configured to decode the optical data by detecting an amplitude of the pulse signal.

7. The electronic device of claim 2, wherein the receiver circuitry is configured to decode the optical data using a normalized amplitude modulation detection scheme.

8. The electronic device of claim 1, wherein the amplifier circuit comprises a transimpedance amplifier.

9. The electronic device of claim 1, wherein the data slicer circuit is configured to detect an edge of the output signal, further comprising:
   a data converter circuit configured to sample the output signal multiple times following detection of the edge of the output signal by the data slicer circuit; and
   a decoding circuit configured to receive digital signals from the data converter circuit.

10. The electronic device of claim 9, wherein the data converter circuit comprises a flash analog-to-digital converter.

11. A system comprising:
    a remote data source configured to transmit optical data;
    an electronic device configured to detect proximity to an external object and to communicate with the remote data source, wherein the electronic device comprises a proximity sensor having a light source configured to emit light and having a light detector configured to:
      measure an amount of the emitted light reflecting off the external object; and
      receive the optical data from the remote data source, wherein the remote data source is configured to encode the optical data using pulse width modulation, wherein the electronic device is configured to decode the optical data using a normalized pulse width modulation detection scheme, and wherein the normalized pulse width modulation detection scheme comprises:
        sampling a first integrator output at a first time;
        sampling a second integrator output at a second time different than the first time; and
        computing a ratio based on the first integrator output and the second integrator output.

12. The system of claim 11, wherein the remote data source is configured to perform a firmware update on the electronic device by transmitting the optical data.

13. The system of claim 11, wherein the remote data source is further operable to encode the optical data using amplitude modulation.

14. The system of claim 13, wherein the electronic device is further configured to decode the optical data using a normalized amplitude modulation detection scheme.

15. The system of claim 11, wherein the electronic device is an earbud.

16. An electronic device configured to detect proximity to an external object and to communicate with a remote data source that transmits optical data, comprising:
    a proximity sensor having a light source configured to emit light and having a light detector configured to:
      measure the emitted light reflecting off the external object during a proximity sensing mode; and
      receive the optical data from the remote data source during an in-band communications mode and an out-of-band communications mode, wherein the in-band communications mode encodes data using pulse widths less than a predetermined unit interval, wherein the out-of-band communications mode encodes data using pulse widths greater than the predetermined unit interval, and wherein the optical data includes at least one pulse; and
    control circuitry configured to distinguish between the in-band and out-of-band communications modes by determining whether the at least one pulse has a pulse width less than or greater than the predetermined unit interval.

17. The electronic device of claim 16, wherein the control circuitry is further configured to:
    operate the proximity sensor in the in-band communications mode in response to determining that the pulse width is less than the predetermined unit interval; and
    operate the proximity sensor in the out-of-band communications mode in response to determining that the pulse width is greater than the predetermined unit interval.

* * * * *